United States Patent
Okawa et al.

(10) Patent No.: US 7,531,103 B2
(45) Date of Patent: May 12, 2009

(54) MASK FORMING METHOD, MASK FORMING FUNCTIONAL LAYER, DRY ETCHING METHOD, AND METHOD OF MANUFACTURING AN INFORMATION RECORDING MEDIUM

(75) Inventors: Shuichi Okawa, Tokyo (JP); Kazuhiro Hattori, Tokyo (JP); Katsuyuki Nakada, Tokyo (JP); Mitsuru Takai, Tokyo (JP)

(73) Assignee: TDK Corporation, Tokyo (JP)

( * ) Notice: Subject to any disclaimer, the term of this patent is extended or adjusted under 35 U.S.C. 154(b) by 421 days.

(21) Appl. No.: 10/947,289

(22) Filed: Sep. 23, 2004

(65) Prior Publication Data

US 2005/0067371 A1 Mar. 31, 2005

(30) Foreign Application Priority Data

Sep. 26, 2003 (JP) .............................. 2003-335408

(51) Int. Cl.
*B44C 1/22* (2006.01)
(52) U.S. Cl. ..................................... 216/51; 428/195.1
(58) Field of Classification Search ........................ None
See application file for complete search history.

(56) References Cited

U.S. PATENT DOCUMENTS

| | | | | |
|---|---|---|---|---|
| 4,652,157 A | * | 3/1987 | Uzawa et al. | 400/124.32 |
| 4,937,643 A | * | 6/1990 | Deslauriers et al. | 257/413 |
| 5,949,102 A | * | 9/1999 | Saida et al. | 257/315 |
| 6,706,465 B1 | * | 3/2004 | Sano | 430/320 |
| 6,927,939 B2 | * | 8/2005 | Sasaki et al. | 360/125.67 |
| 2004/0000534 A1 | * | 1/2004 | Lipinski | 216/58 |
| 2004/0038537 A1 | * | 2/2004 | Liu et al. | 438/694 |
| 2004/0173568 A1 | | 9/2004 | Hattori | |

FOREIGN PATENT DOCUMENTS

| | | |
|---|---|---|
| JP | 6-342744 | 12/1994 |
| JP | 8-316121 | 11/1996 |
| JP | 2001-52979 | 2/2001 |
| JP | 2001-110050 | 4/2001 |
| JP | 2004-269910 | 9/2004 |

OTHER PUBLICATIONS

U.S. Appl. No. 10/495,746 to Takahata et al., filed May 27, 2004.

(Continued)

*Primary Examiner*—Allan Olsen
(74) *Attorney, Agent, or Firm*—Grenblum & Bernstein, P.L.C.

(57) ABSTRACT

A mask forming method forms an A mask forming functional layer with an amorphous structure so as to cover an etched body, forms a B mask forming functional layer so as to cover the formed A mask forming functional layer, forms a convex/concave pattern in the formed B mask forming functional layer by carrying out a predetermined process to form a B mask on the A mask forming functional layer, and forms an A mask on the etched body by forming a convex/concave pattern in the A mask forming functional layer by dry etching the A mask forming functional layer using the B mask. By doing so, a convex/concave pattern with extremely small pattern fluctuations can be formed in the A mask forming functional layer.

5 Claims, 4 Drawing Sheets

OTHER PUBLICATIONS

U.S. Appl. No. 10/923,728 to Fujita et al., filed Aug. 24, 2004.
English language abstract of JP 6-342744.
English language Abstract of JP 8-316121.
English language Abstract of JP 2001-52979.
English language Abstract of JP 2001-110050.
English language abstract of JP 6-342744, Dec. 13, 1994.
English language Abstract of JP 8-316121, Nov. 29, 1996.
English language Abstract of JP 2001-52979, Feb. 23, 2001.
English language Abstract of JP 2001-110050, Apr. 20, 2001.

* cited by examiner

F I G. 1 2
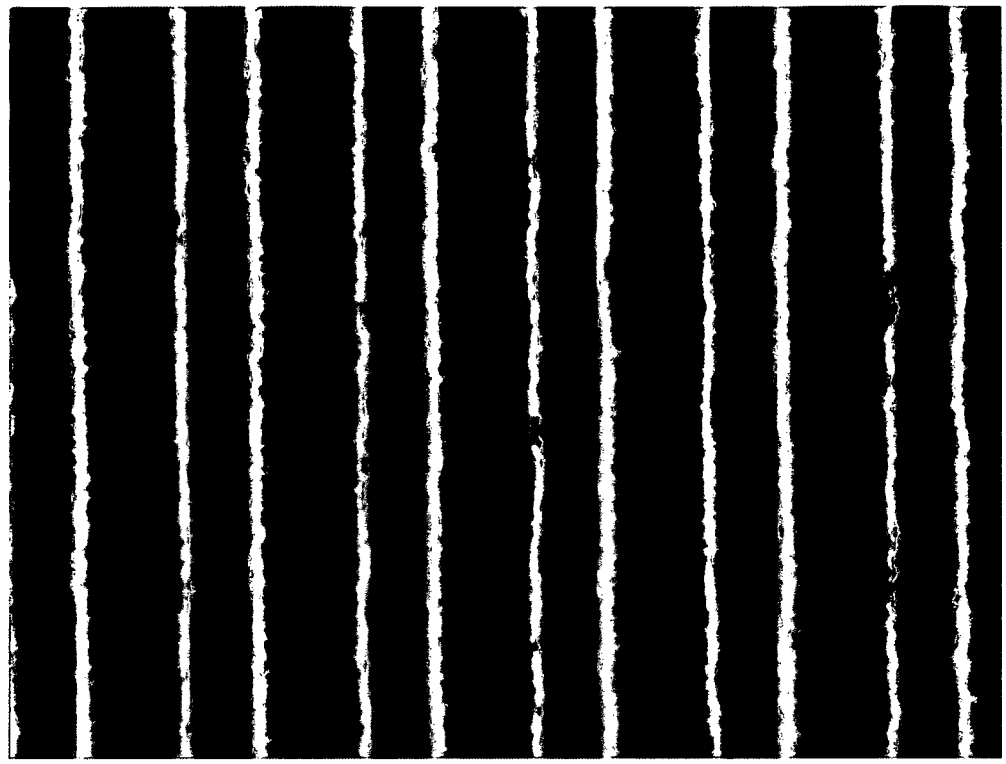
F I G. 1 3
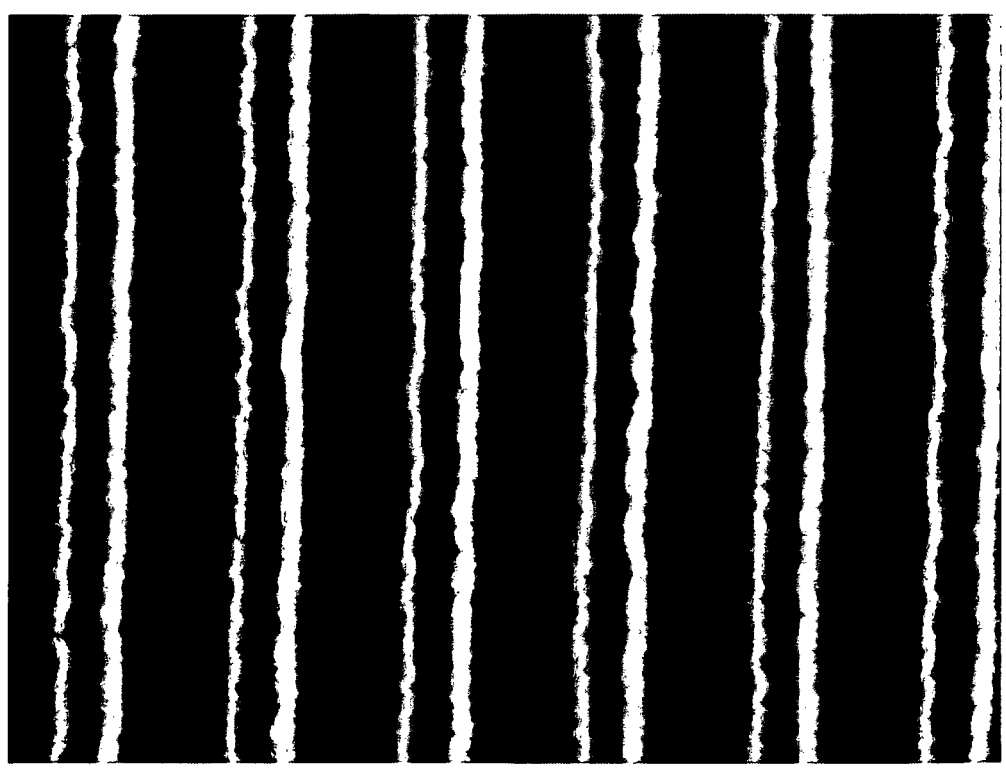

MASK FORMING METHOD, MASK FORMING FUNCTIONAL LAYER, DRY ETCHING METHOD, AND METHOD OF MANUFACTURING AN INFORMATION RECORDING MEDIUM

BACKGROUND OF THE INVENTION

1. Field of the Invention

The present invention relates to a mask forming method for forming a mask used when dry etching an etched body, a dry etching method for dry etching an etched body using a mask formed in accordance with the mask forming method, a method of manufacturing an information recording medium that manufactures an information recording medium using the dry etching method, and a mask forming functional layer that is formed so as to cover an etched body.

2. Description of the Related Art

As one example of a method of manufacturing an information recording medium that forms a mask using this type of mask forming method, the present applicant has proposed a method of dry etching a magnetic material in Japanese Laid-Open Patent Publication No. 2003-058382. More specifically, in the dry etching method proposed by the present applicant, first a base oriented layer, a magnetic thin-film layer, a first mask layer, a second mask layer, and a resist layer are formed in that order on an Si (silicon) substrate to fabricate a processed body. In this case, the base oriented layer is formed with a thickness of around 30 to 300 nm by sputtering using Cr (chromium), a Cr alloy, CoO (cobalt oxide) or MgO (magnesium oxide), NiO (nickel oxide), or the like. The magnetic thin-film layer is formed with a thickness of around 10 to 30 nm by sputtering using a Co (cobalt) alloy. The first mask layer is formed with a thickness of around 10 to 50 nm by sputtering using Ta (tantalum), and the second mask layer is formed with a thickness of around 10 to 30 nm by sputtering using Ni (nickel). In addition, the resist layer is formed with a thickness of around 30 to 300 nm by spin coating using a positive-type resist.

Next, a convex/concave pattern is formed on the second mask layer by carrying out an exposing process on the resist layer of the processed body using an electron beam exposing apparatus and then carrying out a developing process. Next, ion beam etching with Ar (argon) gas is carried out on the second mask layer using the resist layer in which the convex/concave pattern has been formed as a mask to form a convex/concave pattern on the first mask layer. Next, reactive ion etching with $CF_4$ gas or $SF_6$ gas is carried out on the first mask layer using the second mask layer in which the convex/concave pattern has been formed as a mask to form a convex/concave pattern on the magnetic thin-film layer. After this, reactive ion etching with a mixture of CO gas and $NH_3$ gas is carried out on the magnetic thin-film layer using the first mask layer in which the convex/concave pattern has been formed as a mask to form a convex/concave pattern on the base oriented layer. Next, the first mask layer that is left on the convex patterns in the convex/concave pattern is etched using $CF_4$ gas or $SF_6$ gas. By doing so, the fine machining of the magnetic thin-film layer of the processed body is completed, thereby completing a magnetic information recording medium as an information recording medium.

By investigating the dry etching method described above, the present inventors discovered the following problem to be solved. That is, with the above dry etching method, by carrying out reactive ion etching on the first mask layer (a mask forming functional layer) using the second mask layer (also a mask forming functional layer) in which a convex/concave pattern has been formed, a mask (convex/concave pattern) for use when dry etching the magnetic thin-film layer is formed. In this case, when the first mask layer has been formed by sputtering Ta, a first mask layer with crystal grains of various different magnitudes is normally formed on the magnetic thin-film layer. When reactive ion etching of the first mask layer has been carried out using the second mask layer in which the convex/concave pattern has been formed as a mask, the first mask layer is etched with the crystal grains described above as the units of elimination (also referred to as the "elimination units"). Accordingly, since reactive ion etching is carried out with the various crystal grains as the elimination units when forming a convex/concave pattern in the first mask layer, pattern fluctuations, where the convex patterns become jagged in the width direction corresponding to the sizes of the crystal grains, occur in the convex/concave pattern formed on the magnetic thin-film layer. When reactive ion etching of the magnetic thin-film layer has been carried out using the first mask layer, in which a convex/concave pattern with pattern fluctuations has been formed, as a mask, as shown in FIG. 13, pattern fluctuations also occur in the convex/concave pattern formed in the magnetic thin-film layer. It should be noted that FIG. 13 is a figure-substituting photograph in which the convex/concave pattern of the magnetic thin-film layer has been photographed (as one example, the ratio of the width of the convex patterns to the widths of the concave patterns is 4:1), with outline parts of the convex patterns being shown in white.

In this case, when a discrete track-type magnetic recording medium, for example, has been manufactured by dry etching, depending on the formation pitch of the data recording tracks, there is the risk of it being difficult to record and reproduce recording data properly due to the presence of the pattern fluctuations described above. More specifically, for a discrete track-type magnetic recording medium that is being developed by the present inventors, to improve the recording density, the width of the non-magnetic parts (concave parts in the convex/concave pattern formed in the magnetic thin-film layer) between the respective data recording tracks is set at 200 nm or below. On the other hand, the size of the crystal grains described above are comparatively large at 25 nm to 35 nm, and due to the presence of these crystal grains, the amount of fluctuation (the width of the fluctuations) for the pattern fluctuations is 25 nm to 35 nm. Since concaves and convexes (pattern fluctuations) of a size that is ¼ to ⅓ of the width of the non-magnetic parts, which is 100 nm for example, are present, there is the risk that proper recording and reproduction will become difficult for the data recording tracks. For this reason, the realization of a means for forming a convex/concave pattern with small pattern fluctuations in the magnetic thin-film layer is desired. It should be noted that the pattern fluctuations do not just occur during reactive ion etching but also occur during various other etching methods (such as ion beam etching).

SUMMARY OF THE INVENTION

The present invention was conceived in view of the problem described above, and it is a principal object of the present invention to provide a mask forming method that can reduce pattern fluctuations, a dry etching method and a method of manufacturing an information recording medium, and a mask forming functional layer that can form a mask in which a convex/concave pattern of a desired shape can be formed.

A mask forming method according to the present invention includes steps of: forming an A mask forming functional layer with an amorphous structure so as to cover an etched body; forming a B mask forming functional layer so as to cover the formed A mask forming functional layer; forming a convex/concave pattern in the formed B mask forming functional layer by carrying out a predetermined process to form a B mask on the A mask forming functional layer; and forming an A mask on the etched body by forming a convex/concave pattern in the A mask forming functional layer by dry etching the A mask forming functional layer using the B mask.

According to this mask forming method, an A mask forming functional layer with an amorphous structure is formed so as to cover the etched body, and a convex/concave pattern is formed by dry etching the A mask forming functional layer using the B mask, so that it is possible to avoid dry etching the A mask forming functional layer with crystal grains as the elimination units. As a result, it is possible to suppress pattern fluctuations in the A mask (convex/concave pattern) to an extremely small amount. Accordingly, by dry etching the etching body using the A mask, a convex/concave pattern of a predetermined shape (pattern) can be formed, and as a result, it is possible to manufacture an information recording medium for which recording data can be properly recorded and reproduced, for example.

Here, the A mask forming functional layer can be dry etched by reactive ion etching method. With this arrangement of the above embodiment, it is possible to raise the etching rate ratio for the A mask forming functional layer by appropriately selecting the combination of the material forming the B mask forming functional layer and the reactive gas used during etching, and as a result it is possible to properly and easily dry etch the A mask forming functional layer.

The A mask forming functional layer can be formed using a material including at least one of silicon, carbon, germanium, and boron. With this arrangement of the above embodiment, an A mask forming functional layer with an amorphous structure can be formed reliably and easily.

A mask forming functional layer according to the present invention has an amorphous structure and is formed so as to cover an etched body.

According to the mask forming functional layer according to the present invention, the mask forming functional layer has an amorphous structure, so that when a mask is formed by dry etching, it is possible to avoid etching with crystal grains as the elimination units, and as a result, the pattern fluctuations can be suppressed to an extremely small amount. Accordingly, by dry etching the etched body using a mask formed in this mask forming functional layer, it is possible to form a convex/concave pattern of the desired shape (pattern), and as one example it is possible to manufacture an information recording medium for which recording data can be properly recorded and reproduced.

A dry etching method according to the present invention dry etches an etched body using an A mask formed on the etched body according to the mask forming method including steps of: forming an A mask forming functional layer with an amorphous structure so as to cover an etched body; forming a B mask forming functional layer so as to cover the formed A mask forming functional layer; forming a convex/concave pattern in the formed B mask forming functional layer by carrying out a predetermined process to form a B mask on the A mask forming functional layer; and forming an A mask on the etched body by forming a convex/concave pattern in the A mask forming functional layer by dry etching the A mask forming functional layer using the B mask. Here, the A mask forming functional layer can be dry etched by reactive ion etching method. Also, it is possible to form the A mask forming functional layer using a material including at least one of silicon, carbon, germanium, and boron.

With the dry etching method according to the present invention, it is possible to form a convex/concave pattern of the desired shape (pattern) by dry etching an etched body using a mask formed by the mask forming method described above.

Also, the method of manufacturing an information recording medium according to the present invention manufactures an information recording medium by forming an A mask forming functional layer with an amorphous structure so as to cover a magnetic layer for an information recording medium; forming a B mask forming functional layer so as to cover the formed A mask forming functional layer; forming a convex/concave pattern in the formed B mask forming functional layer by carrying out a predetermined process to form a B mask on the A mask forming functional layer; forming an A mask on the magnetic layer for an information recording medium by forming a convex/concave pattern in the A mask forming functional layer by dry etching the A mask forming functional layer using the B mask; and dry etching the magnetic layer for an information recording medium using the A mask.

With the method of manufacturing an information recording medium according to the present invention, by dry etching a magnetic layer for an information recording medium as an etched body using the dry etching method described above, it is possible to form a convex/concave pattern of the desired shape (pattern), and as a result it is possible to provide an information recording medium for which recording data can be properly recorded and reproduced.

It should be noted that the disclosure of the present invention relates to a content of Japanese Patent Application 2003-335408 that was filed on 26 Sep. 2003 and the entire content of which is herein incorporated by reference.

BRIEF DESCRIPTION OF THE DRAWINGS

These and other objects and features of the present invention will be explained in more detail below with reference to the attached drawings, wherein:

FIG. 12 is a figure-substituting photograph in which a surface of a magnetic recording medium has been photographed; and FIG. 13 is a figure-substituting photograph in which a surface of a magnetic recording medium, which has been etched according to a dry etching method proposed by the present applicant, has been photographed.

DESCRIPTION OF THE PREFERRED EMBODIMENTS

Preferred embodiments of a mask forming method, a dry etching method, a method of manufacturing an information recording medium, and a mask forming functional layer according to the present invention will now be described with reference to the attached drawings.

First, the construction of a magnetic recording medium manufacturing apparatus 1 will be described with reference to the drawings.

Figure 1:
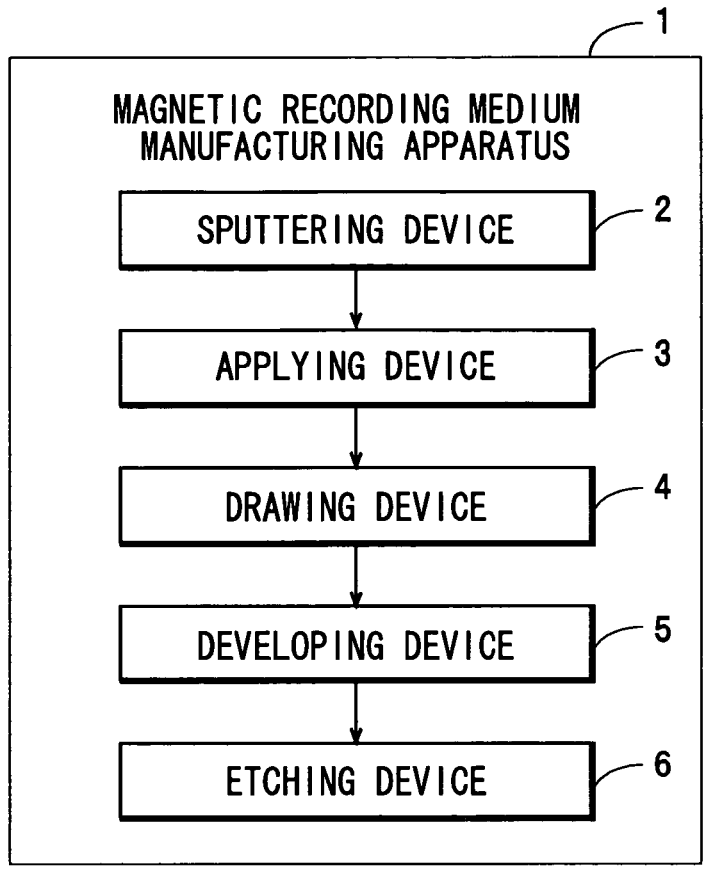
FIG. 1 is a block diagram showing the construction of a magnetic recording medium manufacturing apparatus.
Figure 2:
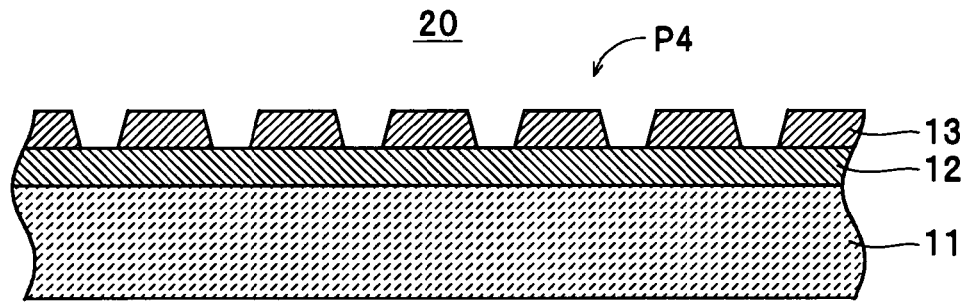
FIG. 2 is a cross-sectional view of a magnetic recording medium.

The magnetic recording medium manufacturing apparatus 1 shown in FIG. 1 is one example of an information recording medium manufacturing apparatus constructed so as to be capable of manufacturing a magnetic recording medium 20 (see FIG. 2) according to a method of manufacturing an information recording medium of the present invention, and includes a sputtering device 2, an applying device 3, a drawing device (an electron beam lithography device) 4, a developing device 5, and an etching device 6. In this case, the magnetic recording medium 20 is one example of an information recording medium according to the present invention, and as shown in FIG. 2, a soft magnetic layer 12 and a magnetic layer 13 (the magnetic layer for an information recording medium that is an "etched body" for the present invention) are laminated on a glass substrate 11. The magnetic recording medium 20 is a so-called discrete track-type magnetic recording medium, with convex parts (convex patterns) of a convex/concave pattern P4 formed in the magnetic layer 13 functioning as data recording tracks. With this magnetic recording medium 20, a concave part formed between a pair of adjacent convex parts removes any magnetic effects both convex parts have on one another so that it is possible to properly record magnetic signals on both convex parts and to reproduce magnetic signals from both convex parts.

Figure 3:
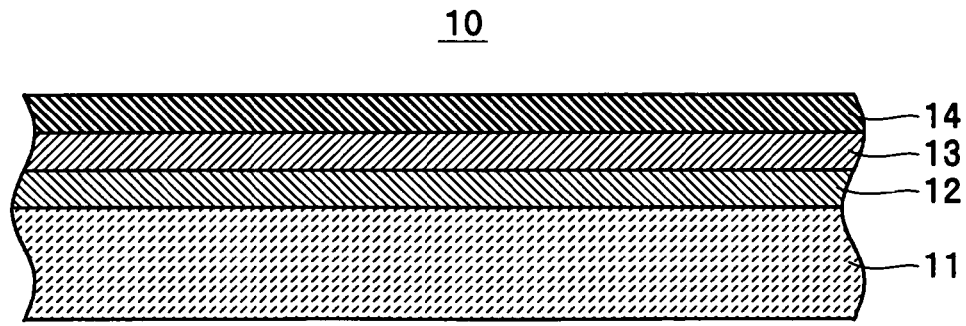
FIG. 3 is a cross-sectional view of a preform.
Figure 6:
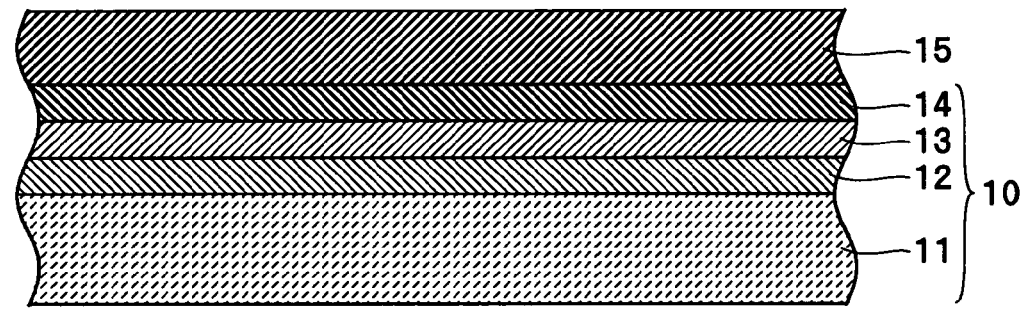
FIG. 6 is a cross-sectional view of a state where one mask forming functional layer has been formed on another mask forming functional layer.
Figure 7:
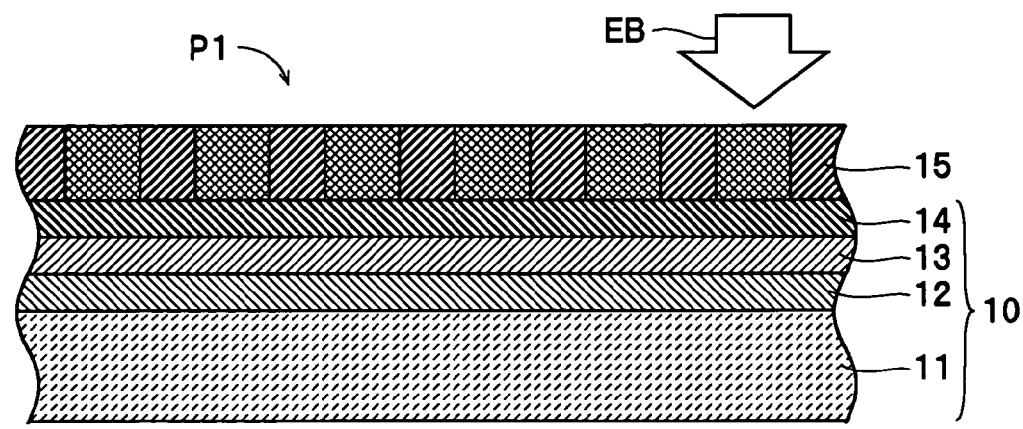
FIG. 7 is a cross-sectional view of a state where an exposure pattern has been-drawn by irradiating a mask forming functional layer with an electron beam.
Figure 8:
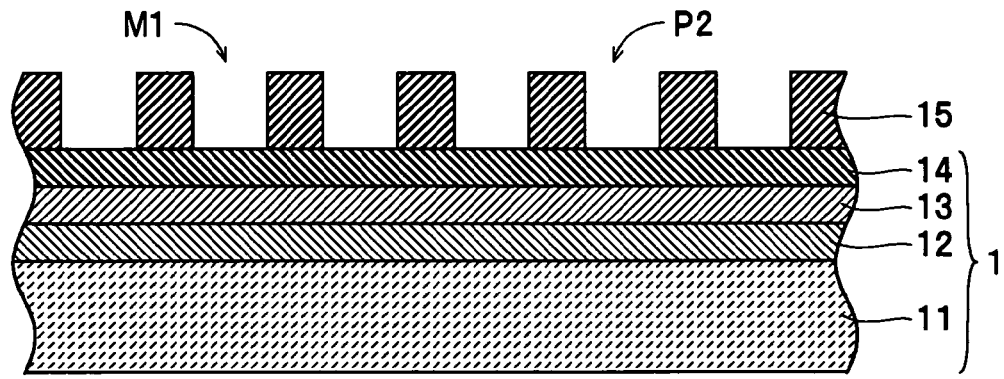
FIG. 8 is a cross-sectional view of a state where a convex/concave pattern (mask) has been formed by carrying out a developing process on a mask forming functional layer in the state shown in FIG. 7.
Figure 9:
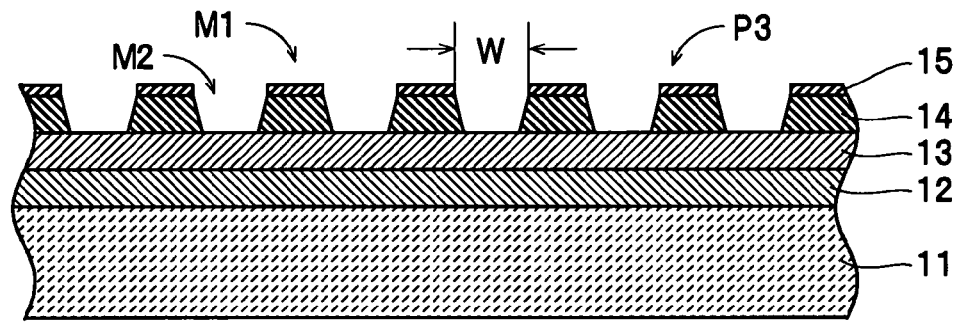
FIG. 9 is a cross-sectional view of a state where a convex/concave pattern (mask) has been formed by dry etching a mask forming functional layer using a mask.
Figure 10:
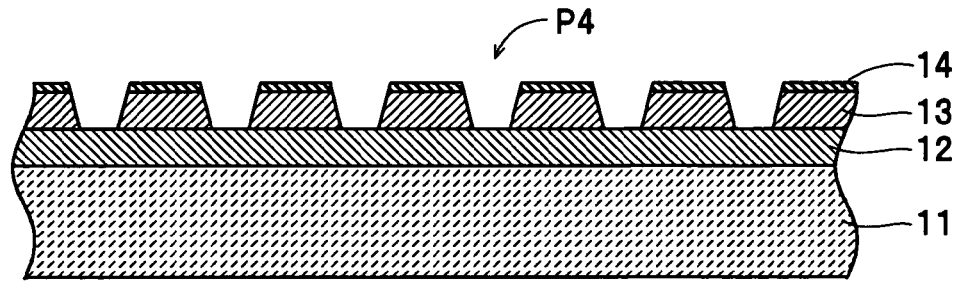
FIG. 10 is a cross-sectional view of a state where a convex/concave pattern has been formed by dry etching a magnetic layer using a mask.

On the other hand, when manufacturing the magnetic recording medium 20, the sputtering device 2 fabricates a recording medium manufacturing preform (hereinafter also referred to as the "preform") 10 shown in FIG. 3. More specifically, the sputtering device 2 forms the preform 10 by carrying out sputtering to form the soft magnetic layer 12, the magnetic layer 13, and a mask forming functional layer 14 in that order on the glass substrate 11. As shown in FIG. 6, the applying device 3 forms, by spin coating, a mask forming functional layer 15 on a mask forming functional layer 14 of the preform 10 fabricated by the sputtering device 2. As shown in FIG. 7, the drawing device 4 draws an exposure pattern P1 on the mask forming functional layer 15 by exposing the mask forming functional layer 15 formed by the applying device 3 to an electron beam EB. The developing device 5 carries out a developing process on the mask forming functional layer 15 on which the drawing of the exposure pattern P1 by the drawing device 4 has been completed to remove parts of the mask forming functional layer 15 that were exposed to the electron beam EB and thereby form a convex/concave pattern (mask M1) P2 as shown in FIG. 8. As shown in FIG. 9, the etching device 6 dry etches the mask forming functional layer 14 using the mask M1 formed by the developing device 5 to form a convex/concave pattern (mask M2) P3. The etching device 6 also dry etches the magnetic layer 13 using the formed mask M2 (one example of "dry etching" for the present invention) to form a convex/concave pattern P4 as shown in FIG. 10. In addition, the etching device 6 removes the mask forming functional layer 14 remaining on the magnetic layer 13 by dry etching.

Next, a method of forming the mask M2 using the magnetic recording medium manufacturing apparatus 1 and a method of manufacturing the magnetic recording medium 20 by dry etching using the mask M2 will be described with reference to the drawings.

Figure 4:
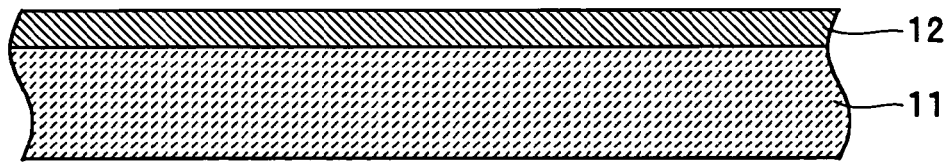
FIG. 4 is a cross-sectional view of a state where a soft magnetic layer has been formed on a glass substrate.
Figure 5:
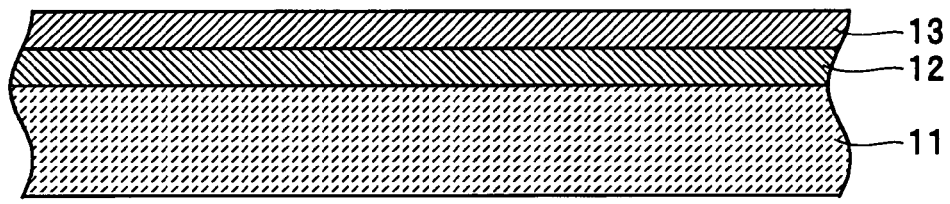
FIG. 5 is a cross-sectional view of a state where a magnetic layer has been formed on the soft magnetic layer.

First, the preform 10 for forming the magnetic recording medium 20 is fabricated. More specifically, as shown in FIG. 4, for the magnetic recording medium manufacturing apparatus 1, first, the sputtering device 2 sputters CoZrNb, for example, according to DC magnetron sputtering on the glass substrate 11 to form the soft magnetic layer 12 with a thickness of around 200 nm. Next, as shown in FIG. 5, the sputtering device 2 sputters CoCr alloy, for example, according to DC magnetron sputtering on the soft magnetic layer 12 to form the magnetic layer 13 with a thickness of around 25 nm. Next, as shown in FIG. 3, the sputtering device 2 sputters TaSi alloy (where Ta:80 at %, Si:20 at %), for example, on the magnetic layer 13 by DC magnetron sputtering to form the mask forming functional layer 14 (the "A mask forming functional layer" for the present invention) with a thickness of around 25 nm.

In this case, when this type of mask forming functional layer is formed, in view of the etching rate ratio for the etched body in accordance with the types of etched body and reactive gas used for the etching, normally tantalum (Ta), nickel (Ni), titanium (Ti), niobium (Nb), or the like is used as the material (hereinafter referred to as the "mask material") for forming the mask forming functional layer, and when such mask materials are used, a mask forming functional layer with a crystal structure is formed when the mask forming functional layer is formed under normal film forming conditions. However, by adding (including) at least one of silicon (Si), carbon (C), germanium (Ge) and boron (B) to such mask materials, it is possible to easily form a mask forming functional layer with an amorphous structure even if the mask forming functional layer is formed in normal film forming conditions. Accordingly, in this example, by carrying out sputtering according to DC magnetron sputtering with a TaSi alloy where the tantalum includes silicon as the mask material, it is possible to form the mask forming functional layer 14 with an amorphous structure on the magnetic layer 13. By doing so, the preform 10 for manufacturing the magnetic recording medium 20 is completed.

Next, as shown in FIG. 6, the applying device 3 applies a positive-type electron beam resist (EB resist) by spin coating so as to cover the mask forming functional layer 14 of the preform 10, thereby forming the mask forming functional layer (a "B mask forming functional layer" for the present invention) 15 with a thickness of around 130 nm. After this, as shown in FIG. 7, the drawing device 4 draws the exposure pattern P1 on the mask forming functional layer 15 by irradiating the mask forming functional layer 15 with an electron beam EB. Next, the developing device 5 carries out a developing process for the mask forming functional layer 15 on which the drawing of the exposure pattern P1 has been completed to remove the parts irradiated by the drawing device 4 with the electron beam EB as shown in FIG. 8. By doing so, the convex/concave pattern P2 (the mask M1 or "B mask" for the present invention) is formed on the mask forming functional layer 14. In this case, the drawing of the exposure pattern P1 by the drawing device 4 and the developing process carried out by the developing device 5 correspond to the "predetermined process" for the present invention. It should be noted that the formation method of the mask M1 (the "predetermined process" for the present invention) is not limited to a method where the exposure pattern P1 is drawn by the drawing device 4 and the developing process is carried out by the developing device 5, and as one example, it is possible to form the mask M1 by a so-called "imprinting method" where a mold (stamper) with a complementary form (a shape where the concaves and convexes are inversed) to the convex/concave pattern P2 is pressed onto the mask forming functional layer 15 applied by the applying device 3 to transfer the convex/concave pattern of the mold to the mask forming functional layer 15 and thereby form the convex/concave pattern P2.

Next, the etching device 6 carries out reactive ion etching on the mask forming functional layer 14 with a fluoride gas ($SF_6$ gas) as the reactive gas. In this case, as one example, the source power of the etching device 6 is set at 1000 W and the bias power at 150W. By doing so, as shown in FIG. 9, the convex/concave pattern P3 (the mask M2 or "A mask" for the present invention) is formed on the magnetic layer 13. In this case, in the formation method for the mask M2 carried out by the magnetic recording medium manufacturing apparatus 1, as described above, the sputtering device 2 forms the mask forming functional layer 14 by DC magnetron sputtering using a TaSi alloy. This means that the mask forming functional layer 14 has an amorphous structure, and as a result, when the etching device 6 carries out reactive ion etching on the mask forming functional layer 14, elimination of the mask forming functional layer 14 in large elimination units is avoided, and the convex/concave pattern P3 (the mask M2) of the desired form is formed with hardly any misshaping of the convex/concave pattern of the mask M1 (in a state where the pattern fluctuations are extremely small).

Next, the etching device 6 carries out reactive ion etching using the mask M2 with the magnetic layer 13 as the etched body for the present invention and a carbonyl gas (CO gas to which $NH_3$ gas has been added) as the reactive gas. When doing so, as one example, the source power of the etching device 6 is set at 1000 W and the bias power at 250W. It should be noted that in this example, the etching rate ratio for the magnetic layer 13 (a value given by dividing the etching rate of the magnetic layer 13 by the etching rate of the mask forming functional layer 14) is 66.7. By doing so, as shown in FIG. 10, the convex/concave pattern P4 with concave parts of the desired depth is formed on the soft magnetic layer 12. After this, the etching device 6 removes the mask forming functional layer 14 remaining on the magnetic layer 13 by carrying out reactive ion etching using fluoride gas ($SF_6$ gas) as the reactive gas. When doing so, as one example, the source power is set at 1000W and the bias power at 50W. By doing so, as shown in FIG. 2, the magnetic recording medium 20 is completed. As described above, this magnetic recording medium 20 is manufactured by etching the magnetic layer 13 using the mask M2 whose pattern fluctuations are extremely small, so that as shown in FIG. 12, the pattern fluctuations are extremely small relative to the widths of the concave parts of the convex/concave pattern P4 formed on the soft magnetic layer 12. It should be noted that FIG. 12 is a figure-substituting photograph in which the convex/concave pattern P4 is photographed (as one example, the ratio of the width of the concave patterns to the widths of the convex patterns is around 2:1), with outline parts of the convex patterns being shown in white. More specifically, when as one example, the width W (see FIG. 9) of the concave parts in the mask M2 (convex/concave pattern P3) is 100 nm (that is, the width of the concave parts in the convex/concave pattern P4 of the magnetic recording medium 20 is 100 nm), the fluctuation amount of the pattern fluctuations produced in the mask M2 is around 5 nm to 10 nm. Accordingly, the convexes and concaves (pattern fluctuations) produced when reactive ion etching is carried out on the mask forming functional layer 14 are extremely small at around $\frac{1}{20}$ to $\frac{1}{10}$ of the width W of the concave parts. Accordingly, a discrete track-type magnetic recording medium 20 for which recording data can be properly recorded and reproduced is realized.

In this way, according to the formation method of the mask M2 described above, the mask forming functional layer 14 with an amorphous structure is formed so as to cover the magnetic layer 13, and the convex/concave pattern P3 is formed by dry etching the mask forming functional layer 14 using the mask M1, so that it is possible to avoid carrying out etching where the elimination unit for the dry etching of the mask forming functional layer 14 is the crystal grain size. As a result, it is possible to suppress the pattern fluctuations that occur in the mask M2 to an extremely small amount. Accordingly, since it is possible to form the convex/concave pattern P4 of the desired shape (pattern) by dry etching the magnetic layer 13 using this mask M2, a magnetic recording medium 20 for which recording data can be properly recorded and reproduced can be manufactured.

Also, according to the method of forming the mask M2 described above, by forming the convex/concave pattern P3 by dry etching the mask forming functional layer 14 by reactive ion etching, the etching rate ratio for the mask forming functional layer 14 can be increased by appropriately selecting the combination of material for forming the mask forming functional layer 15 and reactive gas used in the etching. As a result, it is possible to carry out dry etching properly and easily on the mask forming functional layer 14.

In addition, according to the method of forming the mask M2 described above, by forming the mask forming functional layer 14 using a material (in this example, a TaSi alloy) including at least one of silicon, carbon, germanium, and boron, it is possible to reliably and easily form the mask forming functional layer 14 that has an amorphous structure. Also, by selecting a material used for the mask forming functional layer 14 as appropriate for the etched body (in this example, TaSi alloy), it is possible to form a mask forming functional layer 14 that can be etched reliably and easily with fluoride gas. In addition, it is possible to form the mask M2 with a sufficient etching rate ratio for a mask used when dry etching the magnetic layer 13 with carbonyl gas.

According to the mask forming functional layer 14 described above, since the mask forming functional layer 14 has an amorphous structure, it is possible to avoid etching with crystal grains as the elimination units when forming the mask M2 by dry etching, and as a result, the pattern fluctuations can be suppressed to an extremely small size. Accordingly, by dry etching the magnetic layer 13 using the mask M2 formed in the mask forming functional layer 14, it is possible to form a convex/concave pattern P4 of the desired shape (pattern), and therefore it is possible to manufacture a magnetic recording medium 20 for which recording data can be properly recorded and reproduced.

In addition, according to the above dry etching method (dry etching the magnetic layer 13 using the mask M2), it is possible to dry etch the etched body (in this example, the magnetic layer 13) using the mask M2 described above, which makes it possible to form a convex/concave pattern P4 of the desired shape (pattern).

Also, according to the method of manufacturing the magnetic recording medium 20 described above, by forming the mask M2 on the magnetic layer 13 that is the etched body and dry etching the magnetic layer 13, it is possible to form a convex/concave pattern P4 of the desired shape (pattern), and as a result, a magnetic recording medium 20 for which recording data can be properly recorded and reproduced can be provided.

It should be noted that the present invention is not limited to the above method and construction. As one example, although the mask forming functional layer 14 is formed using TaSi alloy as one example of a mask material, the present invention is not limited to this and the mask forming functional layer 14 can be formed using a mask material produced by adding (including) at least one of carbon, germanium, and boron to tantalum, or a mask material produced by adding (including) at least one of silicon, carbon, germanium, and boron to nickel, titanium, niobium, or the like. By doing so, unlike a mask forming method that uses a mask material including tantalum, nickel, titanium, niobium or the like alone, it is possible to easily form a mask forming functional layer with an amorphous structure. It is also possible to form the mask forming functional layer 14 using silicon, carbon, germanium, boron or the like alone as the mask material. In addition, it is possible to form the mask forming functional layer 14 using a mask material including two or more out of silicon, carbon, germanium, boron, and the like. For these mask materials, it is preferable to select a material so that the etching rate ratio with respect to the etched body is appropriate in accordance with the types of etched body and reactive gas used for the etching.

Figure 11:
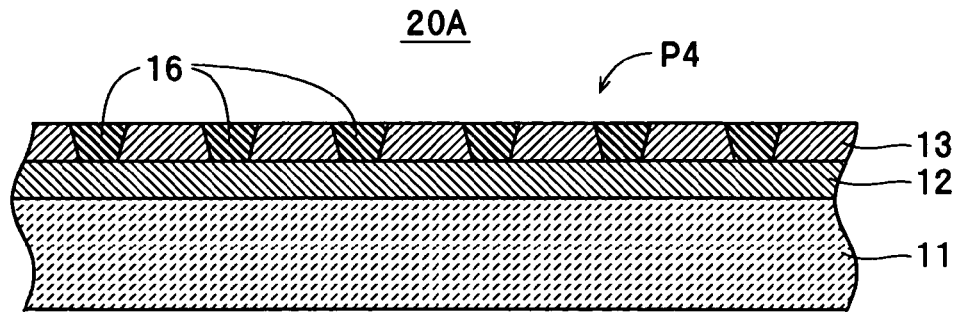
FIG. 11 is a cross-sectional view of another magnetic recording medium.

Also, although an example of a magnetic recording medium 20 where the data recording tracks (the convex parts in the convex/concave pattern P4) are magnetically isolated by the concave parts in the convex/concave pattern P4 formed in the magnetic layer 13 has been described above, the construction of the information recording medium for the present invention is not limited to this, and as one example, it is possible to use a construction such as a magnetic recording medium 20A shown in FIG. 11 where data recording tracks are magnetically isolated by a nonmagnetic body 16 embedded in the concave parts of the convex/concave pattern P4 of the magnetic recording medium 20. Also, although a method of manufacturing a mask M2 for manufacturing the magnetic recording medium 20 has been described in the above example, when manufacturing a recording head or reproduction head for carrying out the recording or reproduction of recording data on an information recording medium, for example, the present invention can be applied with a preform for manufacturing such a head as the etched body. In addition, it is possible to use a construction where a base layer is formed between the glass substrate 11 and the soft magnetic layer 12 for the magnetic recording medium and the preform and a construction where an oriented layer is formed between the soft magnetic layer 12 and the magnetic layer 13.

The invention claimed is:

1. A mask forming method comprising:
    forming an A mask forming functional layer with an amorphous structure so as to cover a body to be etched, using a material produced by adding at least one of silicon (Si), carbon (C), and germanium (Ge) to one of nickel (Ni), titanium (Ti) and niobium (Nb);
    forming a B mask forming functional layer so as to cover the formed A mask forming functional layer;
    forming a convex/concave pattern in the formed B mask forming functional layer by carrying out a predetermined process to form a B mask on the A mask forming functional layer; and
    forming an A mask on the body to be etched by forming a convex/concave pattern in the A mask forming functional layer by dry etching the A mask forming functional layer using the B mask.

2. A mask forming method according to claim 1,
    wherein the A mask forming functional layer is dry etched by reactive ion etching.

3. A dry etching method comprising:
    forming an A mask forming functional layer with an amorphous structure so as to cover a body to be etched, using a material produced by adding at least one of silicon (Si), carbon (C), and germanium (Ge) to one of nickel (Ni), titanium (Ti) and niobium (Nb);
    forming a B mask forming functional layer so as to cover the formed A mask forming functional layer;
    forming a convex/concave pattern in the formed B mask forming functional layer by carrying out a predetermined process to form a B mask on the A mask forming functional layer;
    forming an A mask on the body to be etched by forming a convex/concave pattern in the A mask forming functional layer by dry etching the A mask forming functional layer using the B mask; and
    dry etching the body to be etched using the A mask.

4. A dry etching method according to claim 3,
    wherein the A mask forming functional layer is dry etched by reactive ion etching.

5. A method of manufacturing an information recording medium comprising:
    forming an A mask forming functional layer with an amorphous structure so as to cover a magnetic layer for an information recording medium, using a material produced by adding at least one of silicon (Si), carbon (C), and germanium (Ge) to one of nickel (Ni), titanium (Ti) and niobium (Nb);
    forming a B mask forming functional layer so as to cover the formed A mask forming functional layer;
    forming a convex/concave pattern in the formed B mask forming functional layer by carrying out a predetermined process to form a B mask on the A mask forming functional layer;
    forming an A mask on the magnetic layer for an information recording medium by forming a convex/concave pattern in the A mask forming functional layer by dry etching the A mask forming functional layer using the B mask; and
    dry etching the magnetic layer for an information recording medium using the A mask.

* * * * *